(12) United States Patent
Higuchi et al.

(10) Patent No.: US 7,333,420 B2
(45) Date of Patent: Feb. 19, 2008

(54) RECEIVING PROCESS METHOD AND RECEIVING APPARATUS IN MOBILE COMMUNICATION SYSTEM

(75) Inventors: Kenichi Higuchi, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1228 days.

(21) Appl. No.: 10/058,382

(22) Filed: Jan. 30, 2002

(65) Prior Publication Data
US 2003/0142655 A1 Jul. 31, 2003

(30) Foreign Application Priority Data
Jan. 31, 2001 (JP) .............. 2001-024557

(51) Int. Cl.
*H04J 11/00* (2006.01)
(52) U.S. Cl. ...................................... 370/208
(58) Field of Classification Search ................ 370/201, 370/203, 208, 209
See application file for complete search history.

(56) References Cited

U.S. PATENT DOCUMENTS

| | | | |
|---|---|---|---|
| 5,103,459 A | 4/1992 | Gilhousen et al. |
| 5,646,964 A | 7/1997 | Ushirokawa et al. |
| 5,687,162 A | 11/1997 | Yoshida et al. |
| 5,764,687 A | 6/1998 | Easten |
| 5,787,130 A | 7/1998 | Kotzin et al. |
| 5,920,591 A | 7/1999 | Fukasawa et al. |
| 6,034,986 A | 3/2000 | Yellin |
| 6,067,292 A | 5/2000 | Huang et al. |
| 6,075,793 A | 6/2000 | Schilling et al. |
| 6,459,693 B1 * | 10/2002 | Park et al. ................ 370/342 |
| 6,868,076 B2 * | 3/2005 | Schilling et al. ............ 370/335 |
| 6,917,642 B1 * | 7/2005 | Rouphael et al. ........... 375/140 |

(Continued)

FOREIGN PATENT DOCUMENTS

EP 0 696 856 A2 2/1996

(Continued)

OTHER PUBLICATIONS

Kenichi Higuchi, et al., "Throughput Performance of High-Speed Packet Transmission with Adaptive Modulation and Coding Scheme Using Multipath Interference Canceller in W-CDMA Forward Link", The Institute of Electronics, Information and Communication Engineers, Technical Report of IEICE, vol. 100, No. 346, Oct. 6, 2000, pp. 45-52.

(Continued)

*Primary Examiner*—Melvin Marcelo
(74) *Attorney, Agent, or Firm*—Oblon, Spivak, McClelland, Maier & Neustadt, P.C.

(57) ABSTRACT

A receiving process method of a receiving apparatus used in a mobile communication system is provided in which a sending apparatus sends a plurality of code channels as code channel groups to which spreading codes are assigned to a receiving apparatus, and the receiving apparatus receives the code channels. The receiving process method includes, when spreading codes used for the code channel groups are orthogonal code sequences, generating received spreading signal sequences of the code channel groups according to the number of received paths. The receiving process method further includes removing received spreading signal sequences of a received path of own code channel group of the receiving apparatus which should be removed from the received signals.

21 Claims, 11 Drawing Sheets

U.S. PATENT DOCUMENTS

2001/0019548 A1*  9/2001  Schilling et al. ............ 370/335

FOREIGN PATENT DOCUMENTS

| EP | 0 810 740 A2 | 12/1997 |
| EP | 0 810 742 A2 | 12/1997 |
| JP | 8-335928 | 12/1996 |
| JP | 2000-353984 | 12/2000 |
| JP | 2000-353985 | 12/2000 |
| JP | 2000-353986 | 12/2000 |
| WO | WO 97/21294 | 6/1997 |

OTHER PUBLICATIONS

Koichi Okawa, et al., "Effect of Interference Rejection Weight Control on Parallel-type Coherent Multistage Interference Canceller with Iterative Channel Estimation",The Institute of Electronics, Information and Communication Engineers, Technical Report of IEICE, vol. 100, No. 156, Jun. 23, 2000, pp. 79-84.

Mamoru Sawahashi, et al., "Interference Rejection Weight Control for Pilot Symbol-Assisted Coherent Multistage Interference Canceller in DS-CDMA Mobile Radio", The Institute of Electronics, Information and Communication Engineers, Technical Report of IEICE, vol. 97, No. 322, Oct. 16, 1997, pp. 87-94.

Su Il Kim, et al., "Performance Improvement of RAKE Receiver for a Multicode DS-CDMA System with Multistage Interference Cancellation Detectors", 1999 IEEE TENCON, vol. 1, XP-010368342, Sep. 15, 1999, pp. 573-576.

* cited by examiner

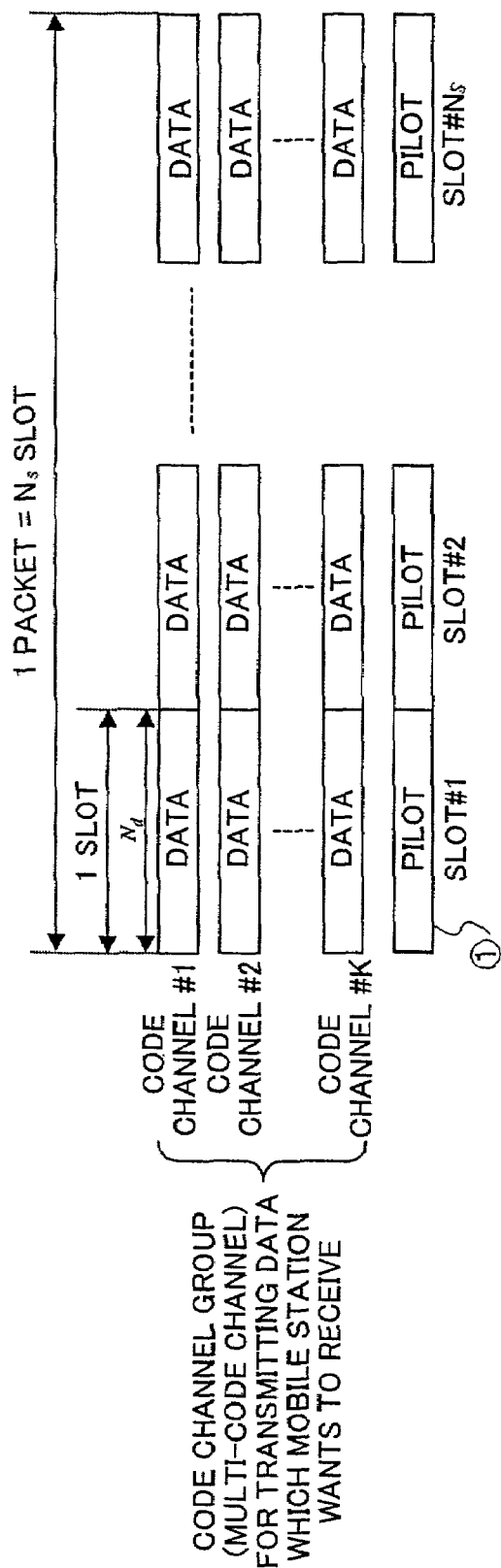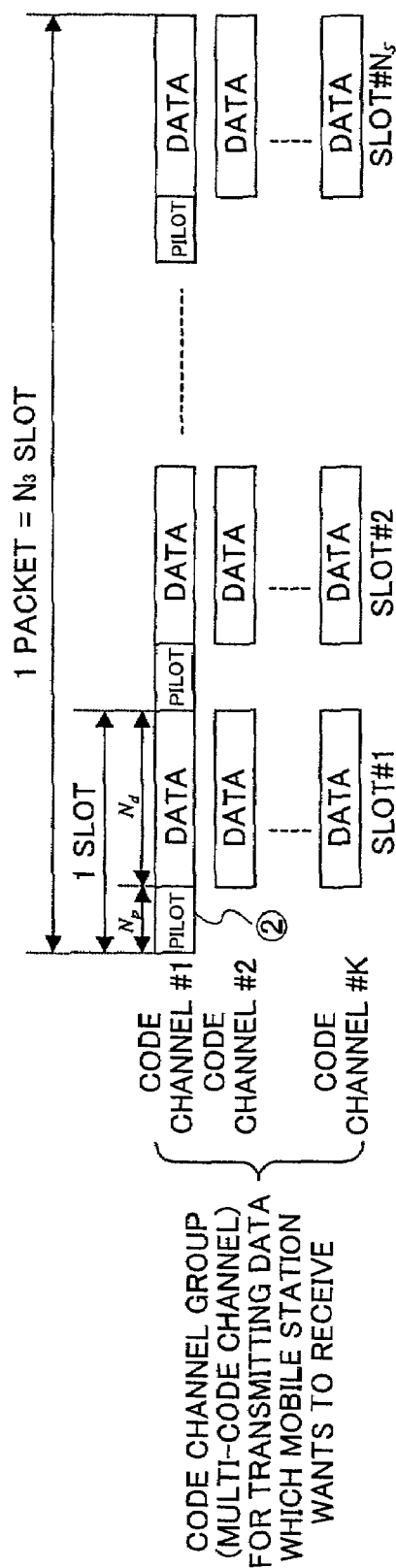

FIG. 11

| | | |
|---|---|---|
| Chip rate | | 3.84 Mcps |
| Symbol rate | | 240 ksps |
| Information bit rate | | 8.42 Mbps |
| Spreading factor (SF) | | 16 |
| Number of multicodes | | 12 |
| Spreading code | Chanelization code | Tree-structured orthogonal sequences |
| | Scrambling code | Truncated Gold sequence |
| Modulation | Data | 64QAM |
| | Spreading | QPSK |
| Channel coding / decoding | | Convolutional coding (Rate=1/2, $k$=9) / Soft decision Viterbi decoding |
| Antenna diversity | | 2-branch |
| Channel model | | $L$-path Rayleigh $f_D$ = 80 Hz |

RECEIVING PROCESS METHOD AND RECEIVING APPARATUS IN MOBILE COMMUNICATION SYSTEM

BACKGROUND OF THE INVENTION

1. Field of the Invention

The present invention relates to a mobile communication system adopting CDMA (DS-CDMA) for performing spread spectrum multiple access. More particularly, the present invention relates to a receiving process method for canceling interference due to multipath when high speed data transmission is performed for down-link transmission from a base station in cellular communication using DS-CDMA.

In addition, the present invention relates to a receiving apparatus which can remove multipath interference according to the receiving process method.

2. Description of the Related Art

Wide band DS-CDMA (W-CDMA) has been adopted as a wireless access method in the next generation mobile communication method IMT-2000 (International Mobile Telecommunication 2000) The maximum information transmission speed in IMT-2000 is 144 kbps in a mobile environment, 384 kbps in a walking environment and 2 Mbps in a quasi-still environment. Thus, it is predicted that multimedia services in addition to voice services will be provided in the next generation mobile communication system. On the other hand, when considering rapid popularization of the Internet, multiplicity of information, enlarging capacity and developments of the next generation internet in recent years, it becomes necessary to develop a wireless access method for realizing information transmission speed exceeding 2 Mbps in mobile communication. Especially in down-link transmission from the base station, it is considered that high-speed and large capacity traffic due to download of images, files, video and the like from databases and web sites will increase. Therefore, a high speed packet transmission technology suitable for such data traffic becomes necessary. Against this backdrop, ultrahigh-speed packet transmission by extending the W-CDMA wireless interface is being studied for realizing high-speed packet transmission exceeding 2 Mbps. For example, application of adaptive modulation/demodulation and error correction (channel coding) and ARQ (Automatic Repeat reQuest) based on adaptive wireless link control (link adaptation) is studied. The adaptive modulation/demodulation and error correction based on the link adaptation are methods for switching modulation level (number of bits in one symbol), SF (spreading factor), multi-code multiplexing number, and coding ratio of error correction according to propagation environment of each user in order to perform high speed data transmission effectively. For example, as the propagation environment for a user becomes better, maximum throughput of the mobile communication system can be increased by switching modulation methods of W-CDMA from QPSK to more effective multilevel modulation, that is, 8 PSK, 16 QAM, 64 QAM modulation. For example, when SF=4, multi-code number is 3, error correction coding ratio is ½, and 64 QAM is used for data modulation, 8.5 Mbps ultrahigh-speed data transmission is theoretically possible by using a W-CDMA wireless interface of chip rate 3.84 Mcps.

As mentioned above, 8.5 Mbps ultrahigh-speed data transmission is theoretically possible by increasing the modulation level, decreasing SF (increasing multi-code number), and increasing coding ratio of error correction. However, increasing the modulation level leads to increasing required desired wave signal power to interference power ratio (SIR) which is necessary for satisfying the same receiving quality (bit error rate).

In addition, when applying the adaptive modulation/demodulation and error correction to an actual mobile communication environment, tolerance to multipath fading (frequency selective fading) becomes important. For example, orthogonalization between users (between code channels) is possible in the same transmission path in a down-link in the W-CDMA. However, degradation of transmission quality occurs due to interference between multipaths under multipath environment.

Generally in DS-CDMA, this multipath interference can be suppressed to 1/SF of received signal power on average for each code channel like general multi-user interference. However, for performing ultrahigh-speed data transmission of 8.5 Mbps by using W-CDMA wireless interface having chip rate 3.84 Mcps, it is necessary to decrease SF near to 1 and increase the multi-code number for increasing data rate. In this case, degradation of received SIR due to multipath interference becomes very large. As a result, even when other user does not exist and even when background noise such as thermal noise is small, an area for realizing high-speed packet transmission of multilevel modulation, low SF and high coding ratio is limited to an area very close to a base station where there is no multipath interference so that average throughput of the system deteriorates.

SUMMARY OF THE INVENTION

A first object of the present invention is to provide a receiving process method for avoiding degradation of receiving characteristics due to multipath interference which is a problem for performing high-speed transmission such as down-link high-speed packet transmission using DS-CDMA in a mobile communication system.

A second object of the present invention is to provide a receiving apparatus for removing multipath interference according to the receiving process method.

The above object is achieved by a receiving process method of a receiving apparatus used in a mobile communication system in which a sending apparatus sends a plurality of code channels as code channel groups to which spreading codes are assigned to a receiving apparatus, and the receiving apparatus receives the code channels, the receiving process method comprising the steps of:

when spreading codes used for the code channel groups are orthogonal code sequences, generating received spreading signal sequences of the code channel groups according to the number of received paths; and removing received spreading signal sequences of a received path of own code channel group of the receiving apparatus which should be removed from received signals.

According to the receiving process method, received spreading signal sequences (=multipath interference replicas) used for canceling interference of code channel groups of received paths which become interference under multipath environment are generated. In the receiving apparatus, interference path occurring between own code channel groups due to multipath is removed by using the multipath interference replicas.

According to the receiving process method of the present invention, interference path due to multipath is canceled, received SIR (Signal-to-interference power ratio) in the receiving apparatus can be improved even under multipath environment. That is, even when high speed data transmission is performed by multiplexing a plurality of code channels under multipath environment, degradation of mean throughput of information transmission speed can be avoided since receiving quality improves. As a result, an area where a base station can provide high speed data transmission in required quality can be enlarged.

From the viewpoint of canceling multipath interference of other code channel group (orthogonal channel) of the sending apparatus to which the receiving apparatus is connected, the receiving process method may includes the steps of:

when spreading codes of other code channels used for control or used for other channels in the code channel group are orthogonal code sequences, generating received spreading signal sequences of the code channel groups according to the number of received paths; and removing received spreading signal sequences of received paths of other code channels which should be removed from received signals.

According to the receiving process, multipath interference occurring between multipaths of other code channel groups sent from the sending apparatus to which own code channels are connected can be canceled. Therefore, received SIR of the receiving apparatus can be further improved.

From the viewpoint of canceling multipath interference of other code channel group (non-orthogonal channel) of the sending apparatus to which the receiving apparatus is connected in multipath environment, the receiving process method may includes the steps of:

when all or a part of the spreading codes used for the code channel groups are non-orthogonal code sequences, generating received spreading signal sequences of the code channel groups according to the number of received paths; and removing received spreading signal sequences of other code channels which are non-orthogonal in the same received path from received signals.

According to the receiving process method, it becomes possible to cancel multipath interference occurring between multipaths of other code channel groups (non-orthogonal channel) sent from the sending apparatus to which own code channels are connected and multipath interference occurring in the same path. Therefore, received SIR of the receiving apparatus can be further improved.

From the viewpoint of canceling interference due to received code channel group from an adjacent sending apparatus, the receiving process method may includes the steps of:

when the receiving apparatus receives a code channel group from another sending apparatus which is not connected to the receiving apparatus, generating received spreading signal sequences of the code channel group from another sending apparatus according to the number of received paths; and removing received spreading signal sequences of the code channel group from received signals.

In this case, multipath routes are different between the code channel group sent from the other sending apparatus ton which the receiving apparatuses is not connected and other code channel groups (non-orthogonal channel) sent from the sending apparatus to which the own code channel group is connected. Thus, every channel become interference.

Therefore, according to the receiving process method mentioned above, since all receiving spreading signal sequences generated for non-orthogonal channels and channels of the other sending apparatus are subtracted, received SIR of the receiving apparatus can be further improved.

In the receiving process method, the receiving spreading code sequence may be generated on the basis of an estimated value of channel variations and an estimated value of data modulation obtained for each code channel.

In addition, the receiving process method may include the steps of:

the sending apparatus sending pilot signals of which the receiving apparatus knows sending phase and sending amplitude to the receiving apparatus periodically; and the receiving apparatus measuring received phase and received amplitude of the pilot signals, and obtaining the estimated value of the channel variations by comparing the sending phase and sending amplitude with received phase and received amplitude.

The receiving process method may include the steps of:

the receiving apparatus obtaining the estimated value of channel variations by averaging the estimated value of channel variations obtained by using the pilot signals and an estimated value of channel variations obtained by comparing decision results of data modulation with receiving phase and amplitude for data signals.

From the viewpoint of improving generation accuracy of the multipath interference replica by updating estimated value of the channel variations, the receiving process method may include the steps of:

obtaining the estimated value of channel variations on the basis of the pilot signals, the data signals and the decision results of the data modulation;

updating data modulation decision results by using the estimated value of channel variations; and updating the estimated value of channel variations on the basis of the updated data modulation decision results.

In the receiving process method, the same estimated value may be used as the estimated value of channel variations for code channels sent form the same sending apparatus.

As for estimation of data modulation used for generating the multipath interference replicas, the receiving process method may includes the steps of:

performing coherent detection by using the estimated value of channel variations for received despread signals of data signals obtained by despreading received signals from which the received spreading signal sequences have been subtracted;

wherein, when the receiving apparatus receives signals by path diversity or by antenna diversity, the receiving apparatus estimates data modulation by performing hard decision for signals on which antenna diversity has been performed.

The receiving process method may include the steps of:

when the sending apparatus performs data modulation for sending original information data sequences which have been error correction coded beforehand, the receiving apparatus performing coherent detection by using the estimated value of channel variations for received despread signal of data signals obtained by despreading received signals from which the received spreading signal sequences have been subtracted, performing error correction decoding on signals after performed antenna diversity combining when signals were received by path diversity or antenna diversity so that original information data sequences are estimated;

the receiving apparatus performing error correction coding on the original information data sequences which is estimated; and the receiving apparatus performing data modulation by using data sequences which are obtained by performing error correction coding on the original information data sequences so that data modulation is estimated.

From the viewpoint of improving receiving quality of signals to be demodulated by using received spreading signal sequences (multipath interference replicas) having high generation accuracy, the receiving process method may include the steps of:

updating the received spreading signal sequences on the basis of updated estimated values of channel variations; and demodulating code channels to be demodulated by using signals obtained by subtracting the updated received spreading signal sequences from received signals.

The above object is also achieved by a receiving apparatus which receives code channel groups each including code channels from sending apparatuses, the receiving apparatus including an interference canceler which comprises a plurality of stages, a first stage of the stages comprising:

a data modulation estimation part and a channel estimation part for estimating data modulation and channel variations for each received code channel which is a subject for interference canceling;

a multiplier for multiplying an estimated data modulation signal by an estimated value of channel variations; and a received spreading signal sequence generation part for obtaining a received spreading signal sequence for each multipath by performing spreading a received signal by using a corresponding spreading code;

a stage after the first stage in the stages comprising:

an other channel multipath interference canceling part for subtracting received spreading code sequences of other code channels obtained in the previous stage from received signals for each received code channel which is a subject for interference canceling;

an own channel multipath interference canceling part for subtracting received spreading signal sequences of own code channels obtained in the previous stage corresponding to a path which is a subject for demodulation;

a part for preparing signals corresponding to the number of multipaths obtained by subtracting received spreading signal sequences from received signals by the other channel multipath interference canceling part and by the own channel multipath interference canceling part, and updating estimated values of data modulation and channel variations by using the prepared signals;

a received spreading signal sequence updating part for updating received spreading signal sequences on the basis of updated estimated values of data modulation and channel variations;

a last stage in the stages comprising a data demodulation part for demodulating data by using signals obtained by subtracting received spreading code sequences obtained in the previous stage from received signals for code channels to be demodulated.

The receiving apparatus may include:

a data modulation estimation adaptive switching part for switching between a first data modulation estimation part and a second data modulation estimation part for performing estimation of data modulation in each stage of the interference canceler;

the first data modulation estimation part estimating data modulation by performing hard decision for signals on which antenna diversity has been performed, when the receiving apparatus receives signals by path diversity or by antenna diversity;

the second data modulation estimation part performing error correction coding on the original information data sequences which were estimated, and performing data modulation by using data sequences which are obtained by performing error correction coding on the original information data sequences so that data modulation is estimated.

In addition, the receiving apparatus may include:

a subtracting part for subtracting received spreading signal sequences from received signals after multiplying the received spreading signal sequences by predetermined interference removing weight coefficients.

BRIEF DESCRIPTION OF THE DRAWINGS

Other objects, features and advantages of the present invention will become more apparent from the following detailed description when read in conjunction with the accompanying drawings, in which:

FIG. 3A shows a sending format example in a case in which a pilot channel is code-multiplexed;

FIG. 3B shows a sending format example in a case in which the pilot channel is time-multiplexed;

FIG. 11 shows data used for the computer simulation shown in FIG. 10.

DETAILED DESCRIPTION OF THE PREFERRED EMBODIMENTS

In the following, embodiments of the present invention will be described with reference to figures.

Figure 1:
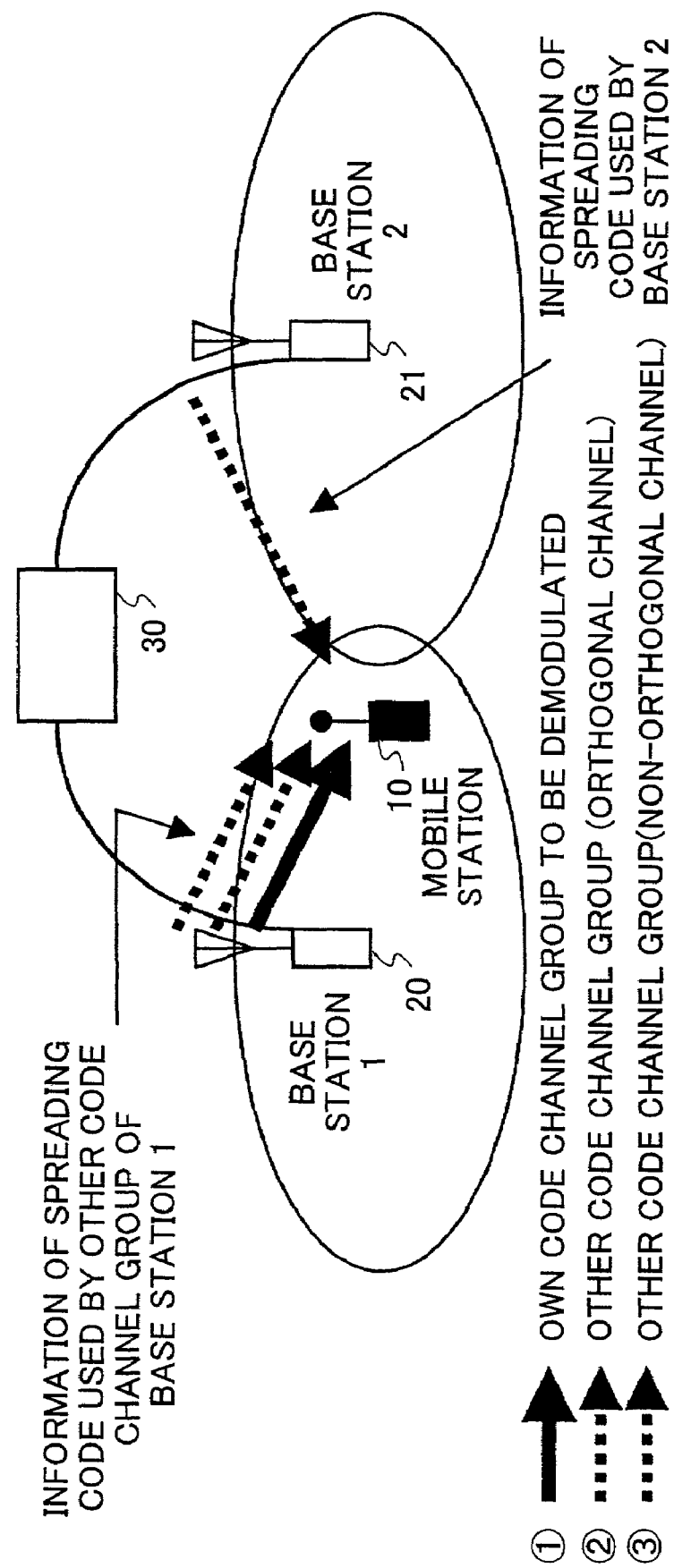
FIG. 1 shows a configuration of a mobile communication system in which a multipath interference canceling method is applied according to an embodiment of the present invention.

FIG. 1 shows a configuration of a mobile communication system in which a multipath interference canceling method is applied according to an embodiment of the present invention.

In FIG. 1, the mobile communication system adopts, for example, CDMA for wireless access. The mobile communication system includes a receiving apparatus 10 (which will be called a mobile station hereinafter), a sending apparatus$_1$ 20 (which will be called a base station$_1$ hereinafter), a sending apparatus$_2$ 21 (which will be called a base station$_2$ hereinafter), and an upper station (example: wireless circuit control apparatus). Each base station 20, 21 sends a plurality of code channels. A part of code channels sent from the same base station are orthogonalized by using orthogonal spreading code and other code channels are not orthogonalized. In a commercial system of W-CDMA and IS-95, all code channels of down-link are basically orthogonalized. However, since special spreading code is used in synchronization channels of W-CDMA, a few number of channels which are not orthogonal to other channels exist. In addition, since the number of spreading codes for orthogonalization is limited, non-orthogonal code channel transmission by using the non-orthogonal spreading codes is performed when code channels the number of which exceeds the limited number are necessary.

As shown in FIG. 1, other code channel groups (②, ③) sent from the base station₁ 20 can be considered to be common channels such as common control channels or communication channels to other carrier. Code channels of other base station (base station₂ 21 in this case) can be orthogonalized in the same path. However, the code channel from the base station₂ 21 can not be orthogonalized to the code channel sent from the base station₁ 20 since they are received by the mobile station 10 asynchronously. In addition, in this example, the base station₁ 20 and the base station₂ 21 send spreading code information to the mobile station 10 as down-link control information for the mobile station 10 to obtain spreading code information of each code channel other than its own channel.

Figure 2:
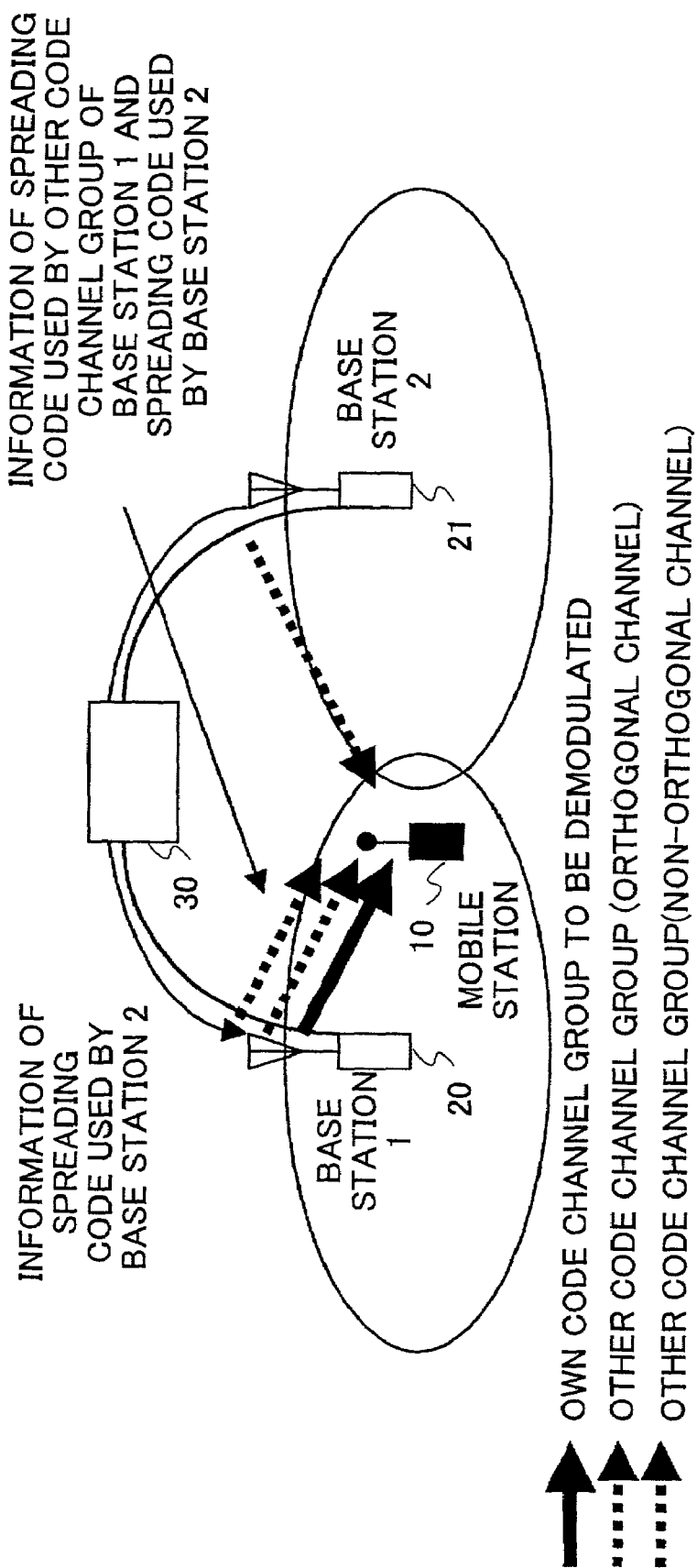
FIG. 2 shows the same configuration as FIG. 1 in which the mobile station 10 obtains the spreading code information of each code channel other than the own channel by using a way different from the way shown in FIG. 1.

FIG. 2 shows the same configuration as FIG. 1 in which the mobile station 10 obtains the spreading code information of each code channel other than the own channel by using a way different from the way shown in FIG. 1. In the example of FIG. 2, the base station₂ 21 sends its own spreading code information to the base station₁ 20 via an upper station, and the base station₁ 20 sends spreading code information of the both base stations (base station₁ 20 and base station₂ 21) to the mobile station 10 as down-link control information.

As mentioned above, although methods in which the base station₁ 20 sends the spreading code information to the mobile station 10 as the control information have been described, there is a method in which the mobile station 10 recognizes spreading codes without information from the base station₁ 20. For example, the mobile station 10 prepares estimated spreading code candidate beforehand, obtains correlation between received signal and the spreading code candidate. As a result, the mobile station 10 can recognize spreading code used in other base station by obtaining spreading code having large correlation.

A sending format of packet data sent from the base station₁ 20 is as shown in FIGS. 3A and 3B, wherein packet data is a sending unit of data, and is obtained by dividing sending data into each constant amount of data.

FIG. 3A shows a sending format example in a case in which a pilot channel is code-multiplexed. In this case, one packet includes Ns slots, and the pilot signals for estimating channels are code-multiplexed to data channels as a code channel which is spread by a spreading code (①). On the other hand, FIG. 3B shows a sending format example in a case in which the pilot channel is time-multiplexed. In this case, the pilot signals are inserted into data signals periodically (for each slot) (②). In addition, one packet (=Ns slot) includes K code channels (#1~#K) in both cases.

In the following, the first case in which the pilot signal is code-multiplexed will be taken for explaining embodiments of the present invention. The pilot channel will be called a common pilot channel (CPICH) since the pilot channel can be also used for channel estimation of other transmission data channels.

Figure 4:
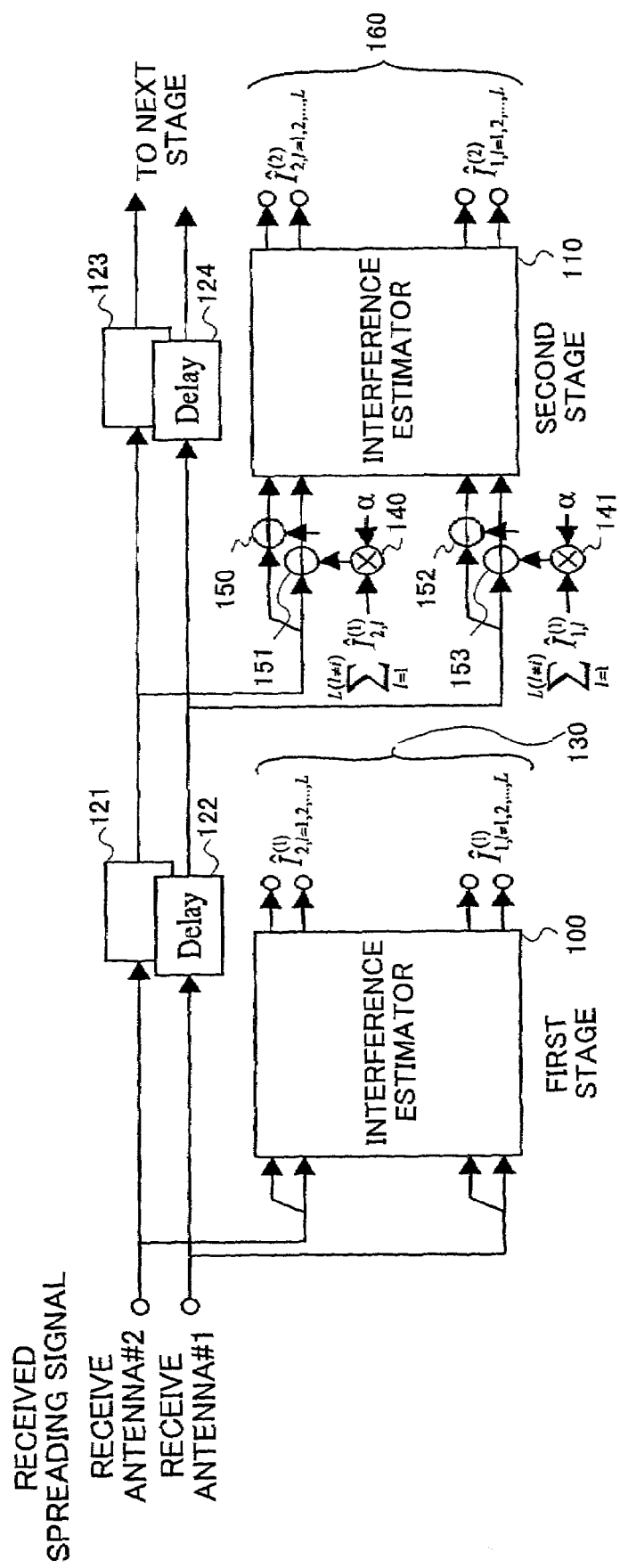
FIG. 4 shows a first configuration example of an interference canceler of the present invention.

A receiving apparatus (which will be called an interference canceler hereinafter) to which the receiving process method of the present invention is applied is configured as shown in FIG. 4 for example. In this example, it is assumed that the interference canceler is used for a down-link by which the base station sends data and the mobile station receives the data.

In FIG. 4, the interference canceler (first configuration example) includes a plurality of stages of interference estimators 100 and 110, delay lines 121-124, subtractors 150-153, multipliers 140, 141, and interference estimator signal output parts 130, 160. In this example, $$I_{b,l}^{(p-1)}$$

represents a received spreading signal sequence of lth path (1<l<L) of bth antenna branch (1<b<B) in pth stage (1<p<P) of the interference estimator. The received spreading signal sequence will be called a multipath interference replica hereinafter. In the first stage interference estimator 100, signals received by the receiving antennas #1 and #2 are directly input. In and after the second stage interference estimator 110, received signals from which all other multipath interference replicas $$I_{b,l}^{(p-1)}$$

generated in the previous stage have been subtracted are input. The interference estimators 100, 110 estimate channels (channel estimation). The channel estimation value is updated for each stage (for each interference estimator stage) by using common pilot channel, or, in addition to this, by using decision data modulation and data symbol. Decision of data modulation by using this is also updated. The multipath interference replica is updated by using the channel estimation value for each stage. Therefore, as channel estimation accuracy and data decision accuracy improve, generation accuracy of the multipath interference replica improves.

Next, the configuration and the operation of the interference estimator 100, 110 will be described with reference to FIG. 5. In the following, the first stage interference estimator 100 will be described as an example.

This interference estimator 100 includes Rake/antenna diversity combining parts 200, 210, a parallel/serial converter (=P/S converter), an error correction decoder 230, hard decision parts 240, 241, an error correction coder 250, a data modulator 260, a serial/parallel converter (=S/P converter) 270, channel estimators 300, 310, multipath interference replica generators 320, 330, spreading parts 340, 341, computing units 350-353, 360-363, an antenna signal input part 400, and a multipath interference replica signal output part 410. In addition, a multiplier 280 which performs complex conjugate operation between signals of the Rake/antenna diversity combining parts 200, 210 and signals from the data modulator 260 is provided in the interference estimator. In addition, the Rake/antenna diversity combining part 200 includes despreading parts 201, 202, multipliers 203, 204 and an adder 205. The channel estimator 300 includes despreading parts 301. 302, and channel estimators 303, 304. The multipath interference replica generator 320 includes spreading parts 321, 322, and multipliers 323, 324.

Canceling of multipath interference due to multipath between the own channel code groups is performed in the following way in the above-mentioned configuration.

An input signal to the despreading part which performs despreading of the lth path of the bth antenna in the pth stage in the interference estimator in the multipath interference canceler is a signal in which all other multipath interference replicas are subtracted from the received signal.

A narrow band modulation signal wave form $d_k(t)$ and spreading signal modulation wave form $c_k(t)$ of kth code channel is represented by the following equations 1 and 2.

$$d_k(t) \sum_{i=\infty}^{\infty} g_k(i) \cdot \exp[j\phi_k(i)] \cdot u_d(t - iT_d) \quad (1)$$

$$c_k(t) = \sum_{i=\infty}^{\infty} \exp[j\phi'_k(i)] \cdot u_c(t - iT_c) \quad (2)$$

In the equations (1) and (2), Td indicates a symbol interval, an Tc indicates a chip interval. In addition, Ud(t)=1(0) for 0<t<Td (otherwise) and Uc(t)=1(0) for 0<t<Tc (otherwise), and N=Td/Tc is SF. $\phi_k'(i) \in \{q\pi/2 + \pi/4; q=0,1,2,3\}$ indicates QPSK spreading modulation by spreading codes in which code channels are orthogonalized by using orthogonal spreading codes, $g_k(i)$ and $\phi_k(i)$ indicate data modulation amplitude and phase respectively, $g_k(i)$ and $\phi_k(i)$ are represented by the following equations respectively according to the data modulation method.

1. OPSK Modulation $$g_k(i) = \sqrt{2} \quad (3)$$

$$\phi_k(i) \in \{q\pi/2 + \pi/4; q = 0, 1, 2, 3\} \quad (4)$$

2. 8PSK Modulation $$g_k(i) = \sqrt{3} \quad (5)$$

$$\phi_k(i) \in \{q\pi/4; q = 0, 1 \ldots, 7\} \quad (6)$$

3. 16QAM Modulation $$g_k(i) = \sqrt{x_k^2 + y_k^2} \quad (9)$$

$$\phi_k(i) = \tan^{-1} \frac{y_k}{x_k} \quad (10)$$

wherein $$x_k \in \left\{ (2q_x + 1)\sqrt{\frac{1}{2.5}} ; q_x = -2, -1, 0, 1 \right\} \quad (7)$$

$$y_k \in \left\{ (2q_y + 1)\sqrt{\frac{1}{2.5}} ; q_y = -2, -1, 0, 1 \right\} \quad (8)$$

4. 64QAM Modulation $$g_k(i) = \sqrt{x_k^2 + y_k^2} \quad (13)$$

$$\phi_k(i) = \tan^{-1} \frac{y_k}{x_k} \quad (14)$$

wherein $$x_k \in \left\{ (2q_x + 1)\sqrt{\frac{1}{7}} ; q_x = -4, -3, \ldots 3 \right\} \quad (11)$$

$$y_k \in \left\{ (2q_y + 1)\sqrt{\frac{1}{7}} ; q_y = -4, -3, \ldots 3 \right\} \quad (12)$$

In the same way, a narrow band modulation signal wave form $d_{cpich}(t)$ and a spreading modulation signal wave form $c_{cpich}(t)$ of the common pilot channel can be represented as follows.

$$d_{cpich}(t) = \sum_{i=-\infty}^{\infty} \exp[j\pi/4] \cdot u_{cpich}(t - iT_{cpich}) \quad (15)$$

$$c_{cpich}(t) = \sum_{i=-\infty}^{\infty} \exp[j\phi_{cpich}(i)] \cdot u_c(t - iT_c) \quad (16)$$

wherein $T_{cpich}$ indicates a symbol interval, and $u_{cpich}(t)=1(0)$ for $0<t<T_{cpich}$ (otherwise). Since spreading by orthogonal spreading code is performed also for the common pilot channel, code channels in the same path are orthogonalized. The sending signals are transmitted in L multipath channels and are received by B receiving antennas. A received signal $r_b(t)$ at the bth antenna can be represented by $$r_b(t) = \sum_{l=1}^{L} \xi_{b,l}(t) \left( \sum_{k=1}^{K} d_k(t - \tau_l) \cdot c_k(t - \tau_l) + d_{cpich}(t - \tau_l) \cdot c_{cpich}(t - \tau_l) \right) + n(t)$$

(17), wherein $v_{b,l}$ indicates complex fading envelope of the lth path of the bth antenna, $\tau_l$ indicates propagation delay of the lth path n(t) indicates additive Gaussian noise component of one-sided power spectrum densely N0/2. A despreading part output of the interference estimator corresponding to the mth symbol of the nth slot for the the lth path of the bth antenna of the kth code channel in the lth stage is indicated by the following equation.

$$z_{k,b,l}^{(1)}(n, m) = \frac{1}{T_d} \int_{nT_{slot}+mT_d+\tau_l}^{nT_{slot}+(m+1)T_d+\tau_l} r_b(t) \cdot c_k^*(t - \hat{\tau}_l) dt \quad (18)$$

In the same way, despreading output of the common pilot channel is represented by the following equation.

$$z_{cpich,b,l}^{(1)}(n, m) = \frac{1}{T_{cpich}} \int_{nT_{slot}+mT_{cpich}+\tau_l}^{nT_{slot}+(m+1)T_{cpich}+\tau_l} r_b(t) \cdot c_{cpich}^*(t - \hat{\tau}_l) dt \quad (19)$$

wherein Tslot indicates a slot interval. A channel estimation value used for Rake combining in rth time of repeated channel estimation (1<r<R) of the pth stage (1<p<P) is represented by $$\hat{\xi}_{b,l}^{(p,r)}(n).$$

A first stage channel estimation value $$\hat{\xi}_{b,l}^{(1,1)}(n)$$

is obtained by the following equation by using the common pilot channel.

$$\hat{\xi}_{b,l}^{(1,1)}(n) = \frac{1}{N_{cpich}} \sum_{i=1}^{N_{cpich}} z_{cpich,b,l}^{(1)}(n, m) \cdot d_{cpich}^*(n, m) \quad (20)$$

wherein Ncpich is a symbol number of the common pilot channel included in one slot. That is, by multiplying the received complex signal by complex conjugate of sending complex signal, complex envelop change of channel is obtained. By using the channel estimation value and by multiplying BL multipath components by complex conjugate of $$\hat{\xi}_{b,l}^{(1,1)}(n),$$

coherent Rake combining output $$\hat{d}_k^{(p=1,r=1)}(n, m)$$

in the mth symbol of the nth slot of the kth code channel is obtained by the following equation.

$$\hat{d}_k^{(1,1)}(n, m) \sum_{b=1}^{B} \sum_{l=1}^{L} z_{k,b,l}^{(1)}(n, m) \cdot \hat{\xi}_{b,l}^{(1,1)*}(n) \quad (21)$$

When tentative data decision is performed after Rake combining is performed, hard decision for data sequence $$\hat{d}_k^{(1,1)}(n, m)$$

is performed, and tentative decision data symbol sequence $$\bar{d}_k^{(1,1)}(n, m) = g_k^{(p=1,r=1)}(n, m) \cdot \exp\left[j\bar{\phi}_k^{(p=1,r=1)}(n, m)\right] \quad (22)$$

is reproduced. On the other hand, the tentative data decision is performed after error correction decoding, branch metric is calculated for $$\hat{d}_k^{(1,1)}(n, m),$$

the branch metric of K code channels is parallel/serial-converted, error correction decoding is performed, so that binary information data sequence $$\hat{b}^{(P=1,r=1)}(i)$$

is obtained. Other methods can be used for error correction decoding. Error correction coding is performed for the decoded information data sequence, and the decoded information data sequence is assigned to K code channels by serial/parallel conversion. After that, data modulation is performed so that tentative decision data symbol sequence $$\bar{d}_k^{(1,1)}(n, m) = g_k^{(1,1)}(n, m) \cdot \exp\left[j\bar{\phi}_k^{(1,1)}(n, m)\right] \quad (23)$$

is reproduced. Then, by multiplying data symbol $z_{k,b,l}^{(l)}(n, m)$ of the despreading part output by complex conjugate of $$\bar{d}_k^{(1,1)}(n, m)$$

(reverse modulation) so that data modulation component is removed, the data symbol can be used as pseudo-pilot symbol. Thus, channel estimation is performed again by using the KNd pseudo-pilot symbols in addition to the common pilot channel, Rake combining is performed and the tentative data decision value is updated. The channel estimation value $$\hat{\xi}_{b,l}^{(1,r+1)}(n)$$

obtained after repeating this process r times is represented by $$\hat{\xi}_{b,l}^{(1,r+1)}(n) = \frac{1}{1+w}\hat{\xi}_{b,l}^{(1,r+1)}(n) + \quad (24)$$

-continued $$\frac{1}{1+w}\frac{1}{\sum_{k=1}^{K}\sum_{m=1}^{N_d}g_k^{-(1,r)}(n,m)^2}\sum_{k=1}^{K}\sum_{m=1}^{N_d}z_{k,b,l}^{(1)}(n,m)\cdot d_k^{-(1,r)*}(n,m).$$

In the above description, although channel estimation using the common pilot channel is performed by averaging pilot channels of one slot interval, this can be also done by other methods which are generally known. For example, the first term of the equation (24) indicates a channel estimation value using the common pilot channel, the second term indicates a channel estimation value in which decision feedback data symbol is regarded as the pseudo-pilot symbol. The channel estimation value by decision feedback data is obtained by using weighted mean value according to amplitude. In addition, w in the equation (24) is a weight coefficient in averaging the channel estimation value by the common pilot channel and the channel estimation value by the decision feedback data symbol. Optimal estimation accuracy can be obtained by using a small value for w when data decision error is large and by using a large value when data decision error is small. w=0 indicates a case where the data symbol is not used for channel estimation. Since the symbol number used for channel estimation increases by adding channel estimation by the decision feedback data, effects of averaging noise and interference increase. Therefore, channel estimation accuracy improves. (However, since decision error is included in the decision feedback data symbol, the decision error may affect the channel estimation accuracy.) In the interference estimator, by using thus obtained channel estimation value $$\hat{\xi}_{b,l}^{(1,R+1)}(n)$$

and the tentative decision data symbol sequence $$\bar{d}_k^{(1,R)}(n,m),$$

the multipath interference replica of the lth path of the bth antenna can be obtained by a following equation.

$$\hat{I}_{b,l}^{(1)}(t-\hat{\tau}_l) = \sum_{t=1}^{L}\hat{\xi}_{b,l}^{(1,R+1)}(t)\left(\sum_{k=1}^{K}\bar{d}_k^{-(1,R)}(t-\hat{\tau}_l)\cdot c_k(t-\hat{\tau}_l) + d_{cpich}(t-\hat{\tau}_l)\cdot c_{cpich}(t-\hat{\tau}_l)\right) \quad (25)$$

By using the multipath interference replica, a despreading part input signal of the interference estimator of the lth path of the bth antenna in the second stage can be represented by the following equation.

$$r_{b,l}^{(2)}(t) = r_b(t) - \alpha\sum_{\substack{j=1\\j\neq l}}^{L}\hat{I}_{b,j}^{(1)}(t-\hat{\tau}_j) \quad (26)$$

wherein α is an interference canceling weight coefficient and 0<α. When error included the generated interference replica is large, this effect can be alleviated by using a small α. However, since too small α decreases the effect of removing interference, the effect of multipath interference removal can be increased by setting optimal α according to generation accuracy of the interference replica. For example, when there are many multipaths, since accuracy of channel estimation degrades, there is a case in which using smaller α is more effective. In addition, as the number of stages becomes large, since the accuracy of the multipath interference replica improves, receiving characteristics can be improved by using larger α.

In the same way, a despreading input signal of the interference estimator of the pth stage (p>2) can be obtained by the following equation by using the multipath interference replicas generated in previous stage.

$$r_{b,l}^{(p)}(t) = r_b(t) - \alpha\sum_{\substack{j=1\\j\neq l}}^{L}\hat{I}_{b,j}^{(p-1)}(t-\hat{\tau}_j) \quad (27)$$

In each stage, for s signal in which the multipath interference replicas are subtracted, channel estimation, tentative decision of data modulation are performed like in the first stage so that the multipath interference replica is updated. Then, in the final stage (p=P), data sequence after Rake combining $$\hat{d}_k^{(P,R)}(n,m)$$

is error-correction-decoded (when error correction coding was performed), and binary information data sequence $$\hat{b}^{(P)}(i)$$

is demodulated.

As mentioned, since a signal in which all other multipath interference replicas $$\hat{I}_{b,l}^{(p-1)}$$

generated in previous stage have been subtracted from the received signal is input into each interference estimator in and after second stage, the multipath interference replica is updated for each stage. Therefore, the multipath interference replica having high accuracy can be used for removing multipath interference of the own channel. Thus, interference canceling of high receiving quality can be realized.

In the above embodiment, although a case in which the common pilot channel is code-multiplexed has been described, the interference canceler of the present invention can be easily applied to a sending format shown in FIG. 3B (a case where common pilot channels are time-multiplexed).

Next, an example for removing multipath interference due to code channel group other than the own channel code group with reference to figures.

Figure 6:
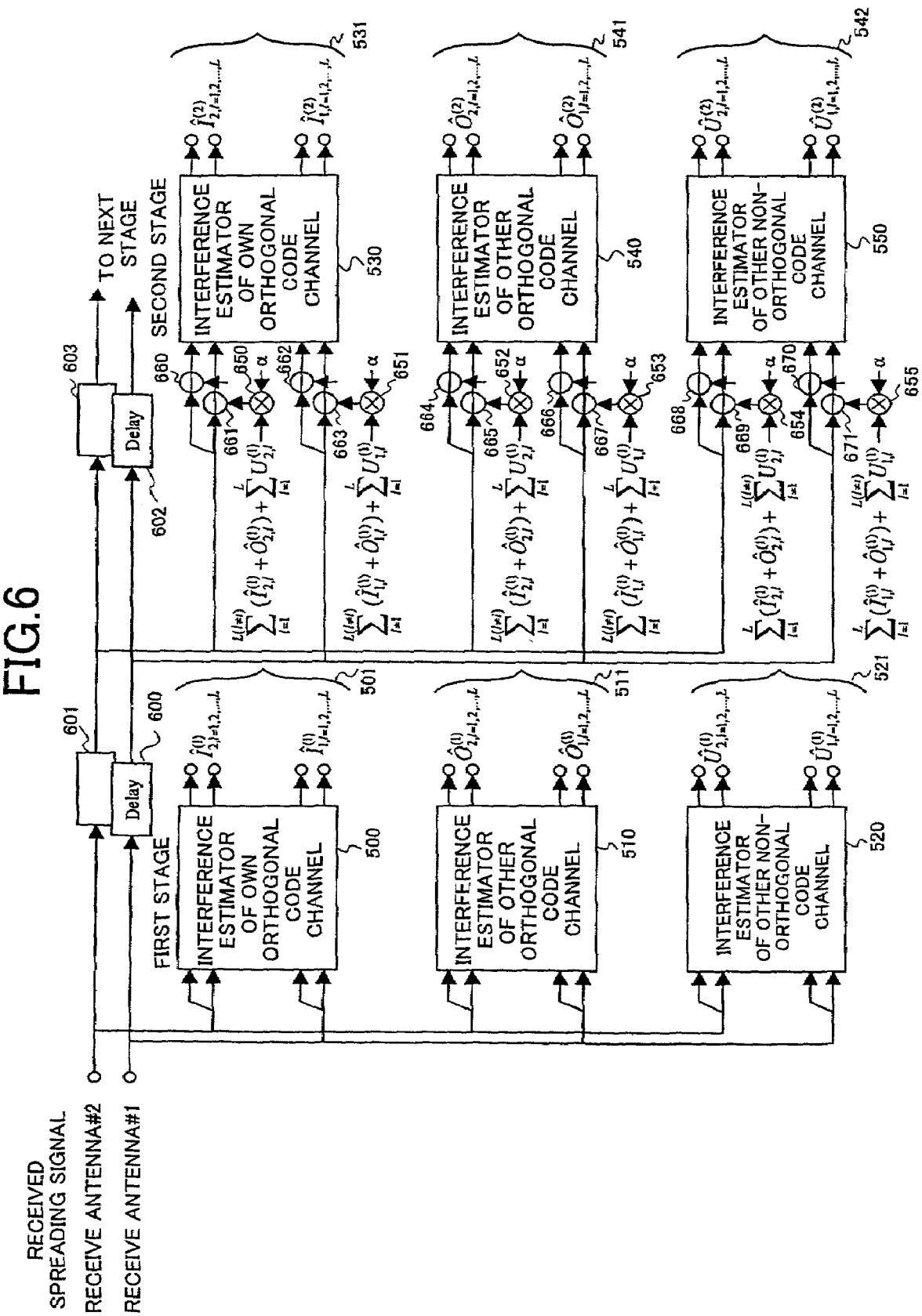
FIG. 6 shows a second configuration example of an interference canceler of the present invention.

Compared with the multipath interference canceler shown in FIG. 4, the multipath interference canceler shown in FIG. 6 includes interference estimators 510, 540 of other orthogonal code channel, and interference estimators 520, 550 of other non-orthogonal code channel. In this embodiment, although the multipath interference canceler includes the interference estimators 520, 550 of other non-orthogonal code channel, it is possible to use processing parts of other sending apparatus instead of the interference estimators 520, 550 of other non-orthogonal code channel.

In the same way as the above-mentioned interference estimator, each interference estimator performs channel estimation and decision of data modulation so that the multipath interference replica is output. In FIG. 6, the multipath interference replica of the own channel is indicated by $$\hat{i}_{b,l}^{(p)},$$

the multipath interference replica of other orthogonal channel is indicated by $$\hat{o}_{b,l}^{(p)},$$

and the multipath interference replica of the other non-orthogonal channel is indicated by $$\hat{u}_{b,l}^{(p)}.$$

In the multipath interference canceling method shown in FIG. 6, estimation of the multipath interference replica for each code channel group is performed in parallel for each stage. That is, in the first stage, the multipath interference replica is generated by using the received signal itself. In the second stage, the multipath interference replica is estimated more accurately on the basis of a signal in which the multipath interference replica estimation value of the first stage is subtracted from the received signal.

Since code channels sent from the same sending station are received by the mobile station 10 after receiving the same channel variation, accuracy of channel estimation can be improved and receiving processing amount can be decreased by performing the above-mentioned channel estimation by providing commonality of channel estimator and by using more common pilot channels and data signals.

In the second configuration example of the interference canceler shown in FIG. 6, the interference estimator in and after the second stage receives a signal obtained by subtracting all other multipath interference replicas generated by the previous stage from the received signal. In this embodiment, as for interference replicas of code channels which are non-orthogonal, multipath interference replica of the same path is also subtracted from the received signal so that receiving quality improves.

Figure 7:
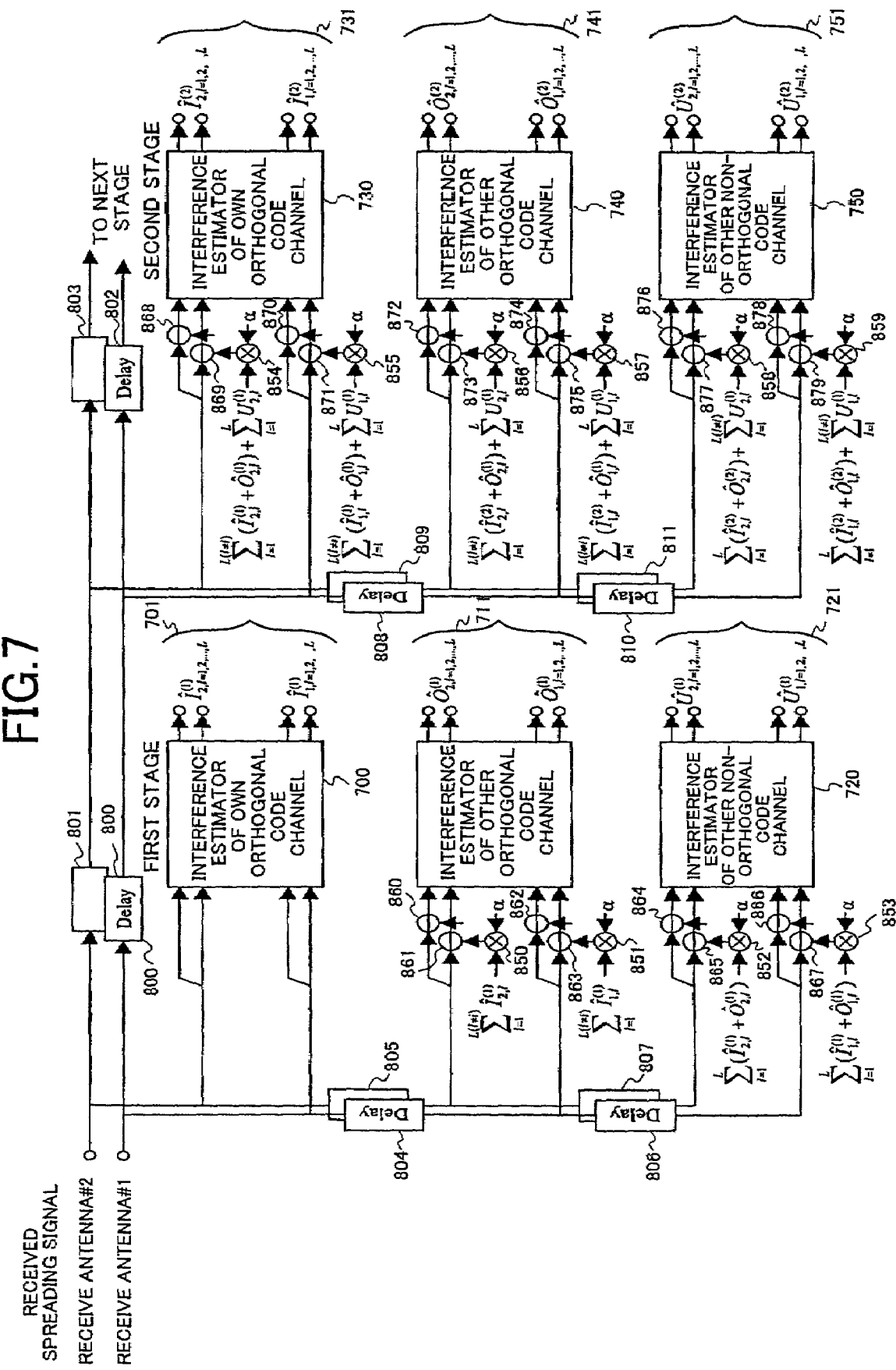
FIG. 7 shows a third configuration example of an interference canceler of the present invention.

On the other hand, in the configuration example 3 of the interference canceler shown in FIG. 7, estimation of the multipath interference replica for each code channel group is performed in series. The configuration of this interference canceler is the same as that of FIG. 6. Interference estimators 700, 730 of the own code channel, interference estimators 710, 740 of other orthogonal code channel, and interference estimators 720, 750 of other non-orthogonal code channel are added. In this embodiment, although the multipath interference canceler includes the interference estimators 720, 750 of other non-orthogonal code channel, it is possible to use possessing parts of other sending apparatus instead of the interference estimators 720, 750 of other non-orthogonal code channel.

In the example of FIG. 7, processes are performed in the order of interference estimation of own channel, interference estimation of other orthogonal code channel and interference estimation of other non-orthogonal code channel. Therefore, in the first stage, interference estimation can be performed for succeeding channel by a signal obtained by subtracting interference replica of processed channel from the received signal. Thus, the performance is better than that of the configuration example 2 shown in FIG. 6. After the second stage, as for an interference estimator, multipath interference replicas for channels which was processed earlier are subtracted from the received signal, in addition, multipath interference replicas obtained in the previous stage for the own channel and channels which will be processes after the own channel are subtracted from the received signal. It can be expected that receiving quality of the configuration example 3 of FIG. 7 is better than the configuration example 2. However, since it can be considered that process delay for signal processing generally becomes large for the example 3, the configuration example 2 or the configuration example 3 is selected according to the circumstances. In addition, it is possible to adopt a combined configuration, for example, a configuration including the configuration example 3 for the first stage and the configuration example 2 in and after the second stage.

Next, multipath interference decreasing effect when the interference canceler (FIGS. 4, 6, 7) of the present invention is applied, and improvement effect of receiving quality obtained by interference decreasing effect will be described with reference to FIGS. 8 and 9.

Figure 8:
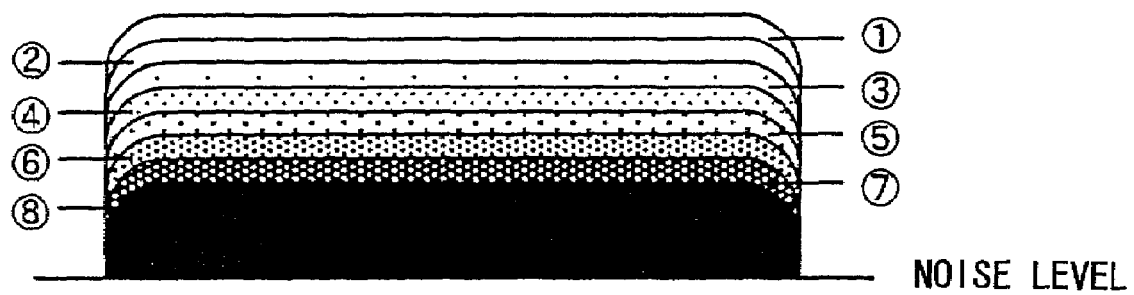
FIG. 8 indicates a case where code channel signals sent from the base stations (base station$_1$ 20 and base station$_2$ 21) are received by the mobile station 10.

FIG. 8 indicates a case where code channel signals sent from the base stations (base station$_1$ 20 and base station$_2$ 21) are received by the mobile station 10 by using two paths on the basis of FIGS. 1 and 2, in which the received paths from the base station$_1$ 20 are indicated as path 1 and path 2 and the received paths from the base station$_2$ 21 are indicated as path 3 and path 4. Therefore, received signal at the mobile station 10 is one in which following code channels are multiplexed.

① received signal of path 1 of the own code channel group (orthogonal channels) to be demodulated ② received signal of path 2 of the own code channel group (orthogonal channels) to be demodulated ③ received signal of path 1 of other code channel group (orthogonal channels) of the base station$_1$ 20 (own cell)

④ received signal of path 2 of other code channel group (orthogonal channels) of the base station$_1$ 20 (own cell)

⑤ received signal of path 1 of other code channel group (non-orthogonal channels) of the base station$_1$ 20 (own cell)

⑥ received signal of path 2 of other code channel group (non-orthogonal channels) of the base station$_1$ 20 (own cell)

⑦ received signal of path 3 of code channel group of the base station$_2$ 21 (other cell)

⑧ received signal of path 4 of code channel group of the base station₂ 21 (other cell)

Figure 9A:
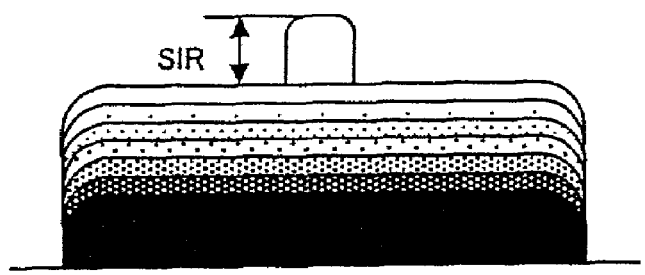
FIGS. 9A-9E shows an interference decreasing effect when the interference canceler of the present invention is applied.

Accordingly, the mobile station 10 receives the signals of ①-⑧ in the same bandwidth as received spread signals corresponding to the examples of FIGS. 1 and 2. The mobile station 10 performs despreading by using spreading code of code channel desired to be demodulated so that only the code channel is converted into narrow band signal and is demodulated. FIG. 9A shows a case where the interference canceling method of the present invention is not applied. In this case, since the path 1 of the own code channel to be demodulated is converted into a narrow band signal and is demodulated, signal component of the same path (① in FIG. 8) of the other orthogonal code channels of the base station 1 does not remain in the despreaded signal, however, other received signals (②-⑧) remain as interference. Therefore, the receiving quality becomes one according to SIR shown in FIG. 9A.

Figure 9B:
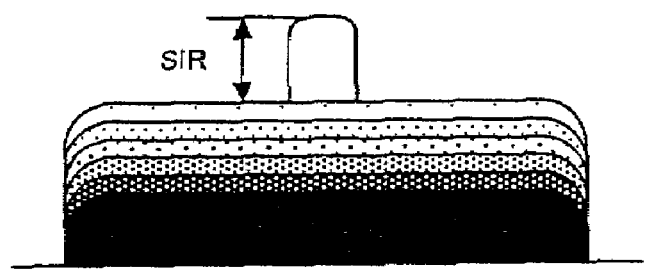
Figure 9C:
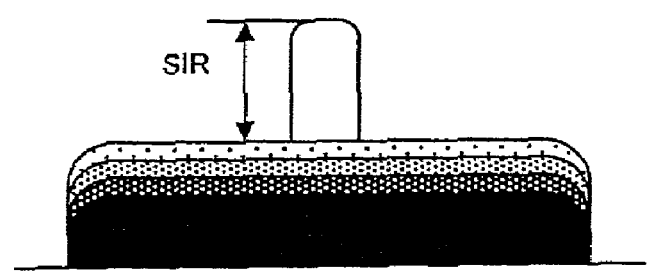
Figure 9D:
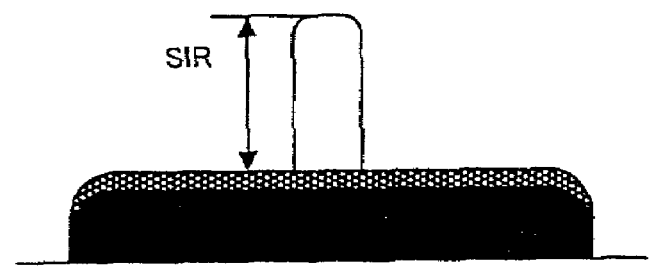
Figure 9E:
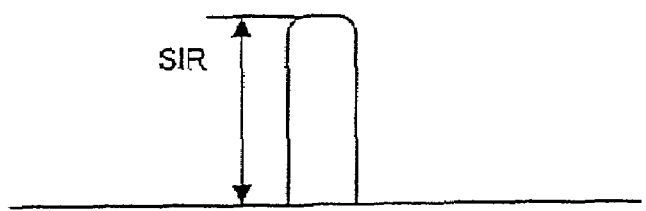

When the interference canceler shown in FIG. 4 is applied for performing interference canceling, interference of other multipath (② of FIG. 8) of the own code channel is removed as shown in FIG. 9B. Thus, the SIR of despread signal becomes larger than that of FIG. 9A in which the interference canceling is not performed so that the receiving quality improves. In addition, when interference canceling is performed on the basis of the interference canceler shown FIG. 5 or FIG. 6, interference estimation is performed for the other orthogonal channels and the other non-orthogonal channels other than the own code channels. Therefore, the effect of interference decreasing becomes as shown in FIGS. 9C-9E. That is, FIG. 9C shows a case where interference canceling is performed for the own code channel and the other code channel group (orthogonal channel) of the base station₁ 20. In this case, interference signals of ③ and ④ of FIG. 8 are removed. In addition, FIG. 9D shows a case where interference canceling is performed for the own code channel+other code channel group (orthogonal channel) of the base station₁ 20+other code channel group (non-orthogonal channel) of the base station₁ 20. In this case, the interference signals of ⑤ and ⑥ shown in FIG. 8 are removed. In addition, FIG. 9E shows a case where interference canceling is performed for the own code channel+other code channel group (orthogonal channel) of the base station₁ 20+other code channel group (non-orthogonal channel) of the base station₁ 20+code channel group of the base station₂ 21. In this case, the interference signals from two paths of the code channel of the base station₂ 21 are removed, further improvement of the received quality becomes possible as shown in FIG. 9E.

Figure 5:
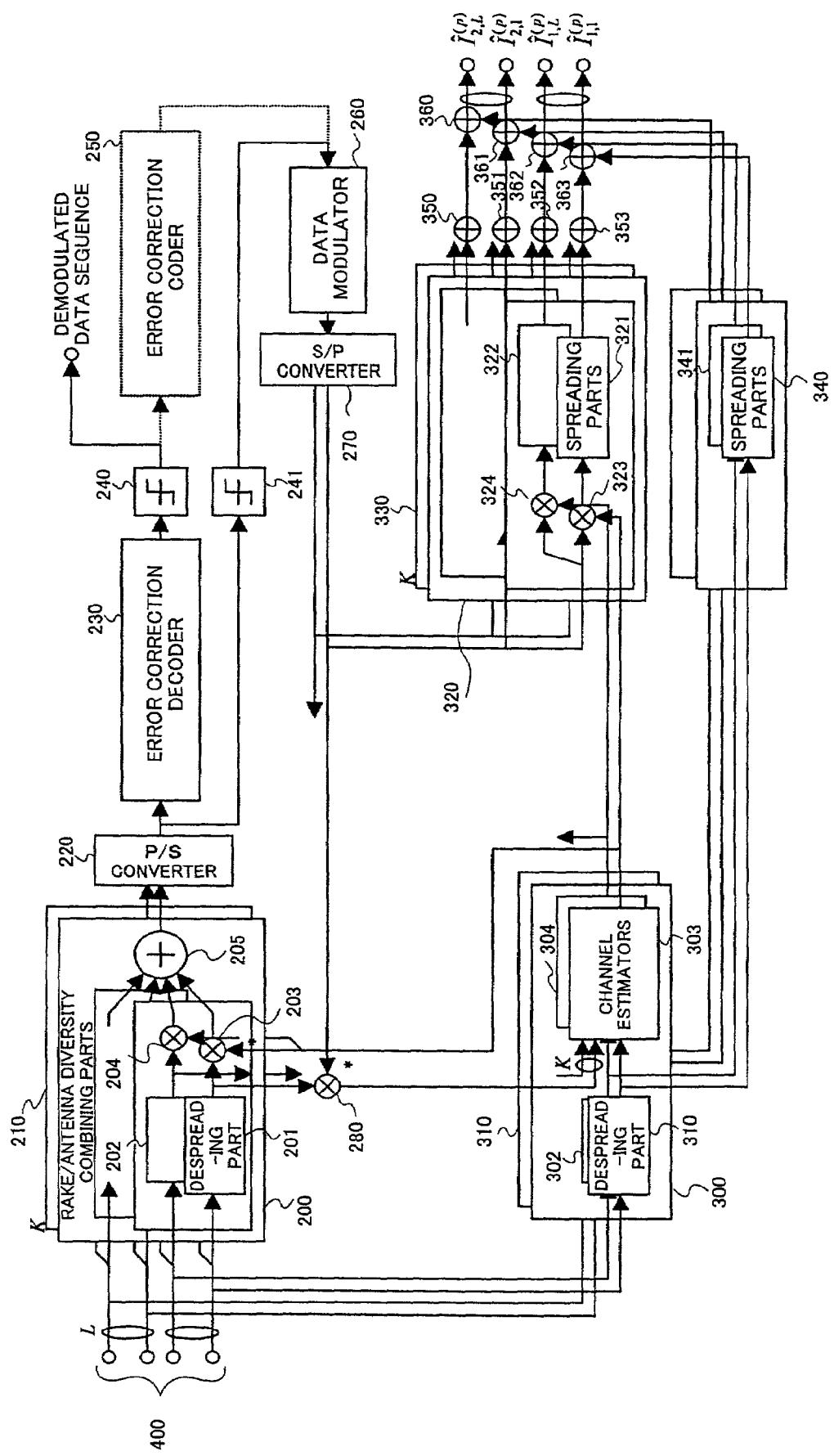
FIG. 5 shows a configuration example of an interference estimator in the interference canceler shown in FIG. 4.

Accordingly, by applying the interference canceler of FIG. 5 or FIG. 6 to mobile communication in which multipath fading occurs, received quality is improved further compared with interference canceler of FIG. 4 since SIR of despreaded signal becomes large.

Figure 10:
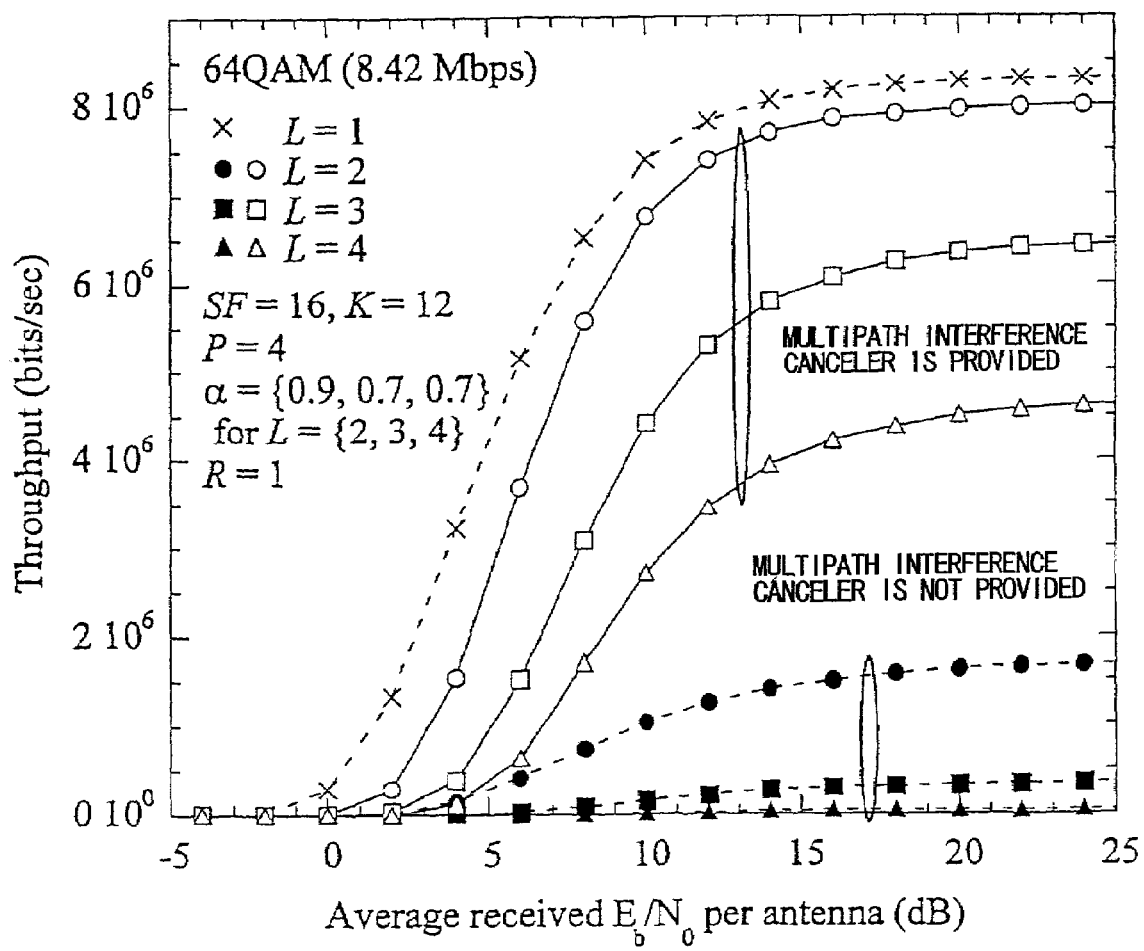
FIG. 10 shows throughput characteristics obtained by computer simulation for a case that the interference canceler of the present invention is applied in a multipath environment.

Next, a result of computer simulation showing effects of this interference canceling method will be described. FIG. 10 shows the throughput characteristics, and FIG. 11 shows data used for the computer simulation.

As shown in FIG. 11, the data for the computer simulation is as follows.

Chip rate (1): 3.84 Mcps, Symbol rate: 240 ksps, Information bit rate: 8.42 Mbps, spreading ratio: 16, number of multicodes: 12, spreading code: orthogonal code sequences, Gold sequences, Modulation method: &4 QAM for data modulation, OPSK for first spreading, Channel coding/decoding: convolutional coding (rate=½, constraint length=9)/soft decision, Viterbi decoding, Antenna diversity: 2branch, Channel model: L-path Rayleigh, Doppler frequency $f_D$=80 Hz.

As shown in FIG. 11, the information bit rate 8.42 Mbps is realized by using 64 QAM data modulation in 3.84 Mcps chip rate, spreading ratio 16, 12 multicodes, convolutional coding ratio ½.

FIG. 10 shows the result of the computer simulation performed by using the data shown in FIG. 11.

In FIG. 10, the vertical axis indicates throughput (bits/sec), the lateral axis indicates average receiving Eb/No(dB) in which Eb/No is signal power to noise power density ratio per 1 information bit.

In this computer simulation, propagation models of L=1-4 paths were evaluated in which interference removing weight coefficients for L=2, 3, 4 are 0.9, 0.7, 0.7 respectively. In addition, the number P of stages of the interference canceler is 4 and repeated number R of channel estimation is 1. In addition, throughput characteristics in which the multipath interference canceler is not applied are evaluated for checking effects of the case in which the multipath interference canceler is applied. In the figure, the cases in which the multipath interference canceler is applied are indicated by X (L=1), ○(L=2), □(L=3), Δ(L=4), and the cases in which the multipath interference canceler is not applied are indicated by ●(L=2), ■(L=3), ▲(L=4).

As shown in the result of computer simulation, high throughput of 8.4 Mbps is achieved in a high Eb/No area in L=1 path environment (X in FIG. 10). However, the throughput deteriorates below 2 Mbps without the multipath interference canceler in L=2 path environment (● in FIG. 10). On the other hand, by applying the interference canceler (4 stages) of the present invention, high throughput of 8 Mbps can be obtained even in the L=2 path environment (○ in FIG. 10). It is understood that the throughput in the multipath environment can be largely improved according to the present invention.

As described above, according to the present invention, the multipath interference replicas are generated on the basis of accurate channel estimation values using decision feedback data after or before error correction (channel coding) decoding of common pilot channels and communication channels in code channels which are spread by orthogonal code sequence and non-orthogonal code sequence, and the multipath interference replicas are removed from the revived signals (multipath interference cancel). Thus, it becomes possible to largely improve received quality (bit error rate, throughput and the like) in multipath environment. As a result, since received signal power required for the same received quality can be largely decreased, an area where high speed data transmission is available covered by a base station can be enlarged compared with a conventional technology in which high speed data transmission is limited to an area very close to the base station where there is no multipath interference.

The channel estimation can be performed without the decision feedback data.

In the above-mentioned examples, the function of the interference canceler corresponds to the other channel multipath interference canceling part, the own channel multipath interference canceling part and the subtracting part. The function of the interference estimator in the interference canceler corresponds to the data modulation estimation part, the channel estimation part, multiplier, received spreading signal sequence generation part, the data modulation estimation updating part, channel estimation updating part, the received spreading code sequence updating part and the data demodulation part.

In addition, the function of interference estimator of the interference canceler corresponds to the first to third channel variation estimation part, the data modulation decision updating part, the channel variation estimation updating part, the same estimation value application part, the coherent detection part, the first and second data modulation estimation part, the original information data sequence estimation part and data modulation estimation adaptive switching part.

As mentioned above, according to the present invention, in cellular communication using DS-CDMA, especially when ultrahigh-speed data communication equal to or higher than the chip rate is performed, received quality can be largely improved in multipath environment by generating multipath interference which largely degrade received quality and by subtracting the multipath interference from the received signals.

In addition, according to the present invention, a receiving apparatus which can cancel multipath interference even when performing ultrahigh-speed data transmission in multipath environment can be provided.

The present invention is not limited to the specifically disclosed embodiments, and variations and modifications may be made without departing from the scope of the invention.

What is claimed is:

1. A receiving process method of a receiving apparatus used in a mobile communication system in which a sending apparatus sends a plurality of code channels as code channel groups to which spreading codes are assigned to a receiving apparatus, and said receiving apparatus receives said code channel groups as received signals, said receiving process method comprising:
   when spreading codes used for said code channel groups are orthogonal code sequences,
   generating received spreading signal sequences of said code channel groups according to the number of received paths; and
   removing a received spreading signal sequence, from the received signals, that is a replica of a signal of an own code channel group of said receiving apparatus transmitted via a path that is different from another path via which said signal of said own code channel group is transmitted.

2. The receiving process method as claimed in claim 1, further comprising:
   when spreading codes of other code channels used for control or used for other channels in said code channel group are orthogonal code sequences,
   generating received spreading signal sequences of said code channel groups according to the number of received paths; and
   removing received spreading signal sequences of received paths of other code channels which should be removed from the received signals.

3. The receiving process method as claimed in claim 1, further comprising:
   when all or a part of said spreading codes used for said code channel groups are non-orthogonal code sequences,
   generating received spreading signal sequences of said code channel groups according to the number of received paths; and
   removing received spreading signal sequences of other code channels which are non-orthogonal in the same received path from the received signals.

4. The receiving process method as claimed in claim 1, further comprising:
   when said receiving apparatus receives a code channel group from another sending apparatus which is not connected to said receiving apparatus,
   generating received spreading signal sequences of said code channel group from said another sending apparatus according to the number of received paths; and
   removing received spreading signal sequences of said code channel group from received signals of said another sending apparatus.

5. The receiving process method as claimed in claim 1, wherein said receiving spreading code sequence is generated on the basis of an estimated value of channel variations and an estimated value of a data modulation obtained for each code channel.

6. The receiving process method as claimed in claim 5, further comprising:
   said sending apparatus sending pilot signals of which said receiving apparatus knows a sending phase and a sending amplitude to said receiving apparatus periodically; and
   said receiving apparatus measuring a received phase and a received amplitude of said pilot signals, and obtaining said estimated value of said channel variations by comparing said sending phase and said sending amplitude with said received phase and said received amplitude.

7. The receiving process method as claimed in claim 6, further comprising:
   said receiving apparatus obtaining said estimated value of channel variations by averaging said estimated value of channel variations obtained by using said pilot signals and an estimated value of channel variations obtained by comparing decision results of said data modulation with said received phase and said received amplitude for data signals.

8. The receiving process method as claimed in claim 7, further comprising:
   obtains said estimated value of channel variations on the basis of said pilot signals, said data signals and said decision results of said data modulation;
   updating said data modulation decision results by using said estimated value of channel variations; and
   updating said estimated value of channel variations on the basis of said updated data modulation decision results.

9. The receiving process method as claimed in claim 5, wherein the same estimated value is used as said estimated value of channel variations for code channels sent from the same sending apparatus.

10. The receiving process method as claimed in claim 5, further comprising:
   performing coherent detection by using said estimated value of channel variations for received despread signals of data signals obtained by despreading received signals from which said received spreading signal sequences have been subtracted;
   wherein, when said receiving apparatus receives signals by path diversity or by antenna diversity, said receiving apparatus estimates data modulation by performing a hard decision for signals on which antenna diversity has been performed.

11. The receiving process method as claimed in claim 5, further comprising:
  when said sending apparatus performs data modulation for sending original information data sequences which have been error correction coded beforehand,
  said receiving apparatus performing coherent detection by using said estimated value of channel variations for received despread signal of data signals obtained by despreading received signals from which said received spreading signal sequences have been subtracted, performing error correction decoding on signals after performing antenna diversity combining when signals were received by path diversity or antenna diversity so that original information data sequences are estimated;
  said receiving apparatus performing error correction coding on said original information data sequences which are estimated; and
  said receiving apparatus performing data modulation by using data sequences which are obtained by performing error correction coding on said original information data sequences so that data modulation is estimated.

12. The receiving process method as claimed in claim 8, further comprising:
  updating said received spreading signal sequences on the basis of updated estimated values of channel variations; and
  demodulating code channels by using signals obtained by subtracting said updated received spreading signal sequences from received signals.

13. A receiving apparatus which receives code channel groups each including code channels from sending apparatuses, said receiving apparatus including an interference canceler which comprises a plurality of stages,
  a first stage of said stages comprising:
  a data modulation estimation part and a channel estimation part for estimating data modulation and channel variations for each received code channel which is a subject for interference canceling;
  a multiplier for multiplying an estimated data modulation signal by an estimated value of channel variations; and
  a received spreading signal sequence generation part for obtaining a received spreading signal sequence for each multipath by performing spreading a received signal by using a corresponding spreading code;
  a stage after said first stage in said stages comprising:
  an other channel multipath interference canceling part for subtracting received spreading code sequences of other code channels obtained in the previous stage from received signals for each received code channel which is a subject for interference canceling;
  an own channel multipath interference canceling part for subtracting received spreading signal sequences of own code channels obtained in the previous stage corresponding to a path which is a subject for demodulation;
  a part for preparing signals corresponding to the number of multipaths obtained by subtracting received spreading signal sequences from received signals by said other channel multipath interference canceling part and by said own channel multipath interference canceling part, and updating estimated values of data modulation and channel variations by using said prepared signals;
  a received spreading signal sequence updating part for updating received spreading signal sequences on the basis of updated estimated values of data modulation and channel variations;
  a last stage in said stages comprising a data demodulation part for demodulating data by using signals obtained by subtracting received spreading code sequences obtained in the previous stage from received signals for code channels to be demodulated.

14. The receiving apparatus as claimed in claim 13, said receiving apparatus comprising a first channel variation estimation part for sending pilot signals of which said receiving apparatus knows sending phase and sending amplitude to said receiving apparatus periodically; and for measuring received phase and received amplitude of said pilot signals, and obtaining said estimated value of said channel variations by comparing said sending phase and sending amplitude with received phase and received amplitude.

15. The receiving apparatus as claimed in claim 14, said receiving apparatus comprising a second channel variation estimation part for performing estimation of channel variations by averaging said estimated value of channel variations obtained by said first channel variation estimation part and an estimated value of channel variations obtained by comparing decision results of data modulation with receiving phase and amplitude for data signals.

16. The receiving apparatus as claimed in claim 15, said receiving apparatus comprising:
  a third channel variation estimation part for performing estimation of channel variations on the basis of said pilot signals, said data signals and said decision results of said data modulation;
  a data modulation decision updating part for updating data modulation decision results by using an estimated value of channel variations obtained by said third channel variation estimation part; and
  a channel variation estimation updating part for updating said estimated value of channel variations on the basis of said updated data modulation decision results.

17. The receiving apparatus as claimed in claim 15, wherein the same estimated value is used as said estimated value of channel variations for code channels sent form the same sending apparatus.

18. The receiving apparatus as claimed in claim 13, comprising:
  an coherent detection part for performing coherent detection by using said estimated value of channel variations for received despread signals of data signals obtained by despreading received signals from which said received spreading signal sequences have been subtracted;
  a first data modulation estimation part for estimating data modulation by performing hard decision for signals on which antenna diversity has been performed, when said receiving apparatus receives signals by path diversity or by antenna diversity.

19. The receiving apparatus as claimed in claim 13, comprising:
  a coherent detection part for performing coherent detection by using said estimated value of channel variations for received despread signal of data signals obtained by despreading received signals from which said received spreading signal sequences have been subtracted when said sending apparatus performs data modulation for sending original information data sequences which have been error correction coded beforehand;
  an original information data sequence estimation part for performing error correction decoding on signals after performed antenna diversity combining when signals were received by path diversity or antenna diversity so that original information data sequences are estimated;

a second data modulation estimation part for performing error correction coding on said original information data sequences which were estimated, and performing data modulation by using data sequences which are obtained by performing error correction coding on said original information data sequences so that data modulation is estimated.

20. The receiving apparatus as claimed in claim 13, comprising:

a data modulation estimation adaptive switching part for switching between a first data modulation estimation part and a second data modulation estimation part for performing estimation of data modulation in each stage of said interference canceler;

said first data modulation estimation part estimating data modulation by performing hard decision for signals on which antenna diversity has been performed, when said receiving apparatus receives signals by path diversity or by antenna diversity;

said second data modulation estimation part performing error correction coding on said original information data sequences which were estimated, and performing data modulation by using data sequences which are obtained by performing error correction coding on said original information data sequences so that data modulation is estimated.

21. The receiving apparatus as claimed in claim 13, comprising a subtracting part for subtracting received spreading signal sequences from received signals after multiplying said received spreading signal sequences by predetermined interference removing weight coefficients.

* * * * *